W. R. MITTENDORF.
SCALE.
APPLICATION FILED JUNE 11, 1908.
921,436.
Patented May 11, 1909.
3 SHEETS—SHEET 3.
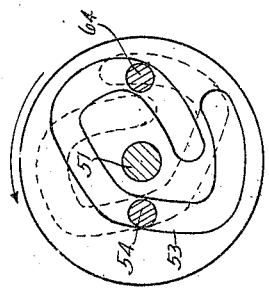
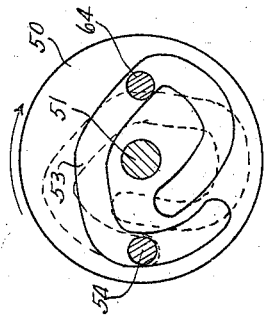
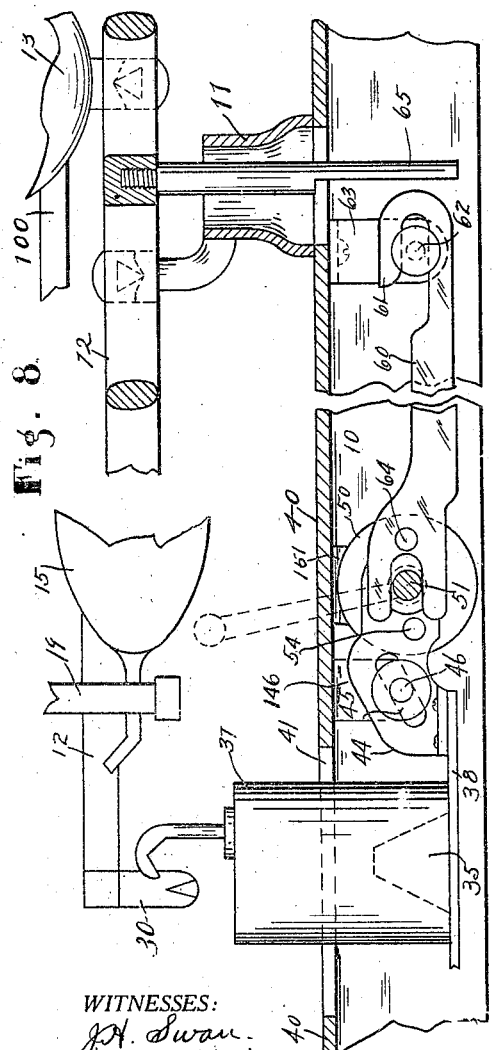
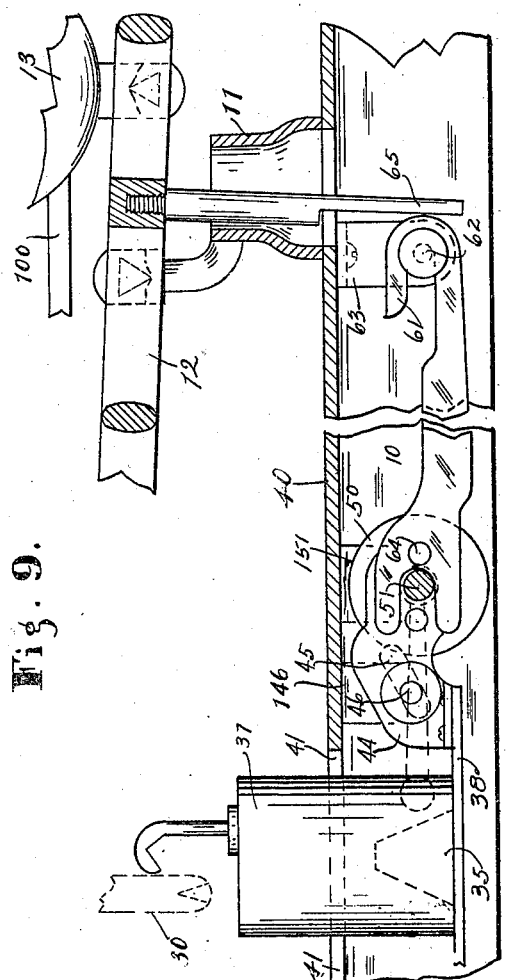
WITNESSES:
J. H. Swan
O. M. Greener
INVENTOR.
William R. Mittendorf
BY
D. H. Lockwood
ATTORNEY.

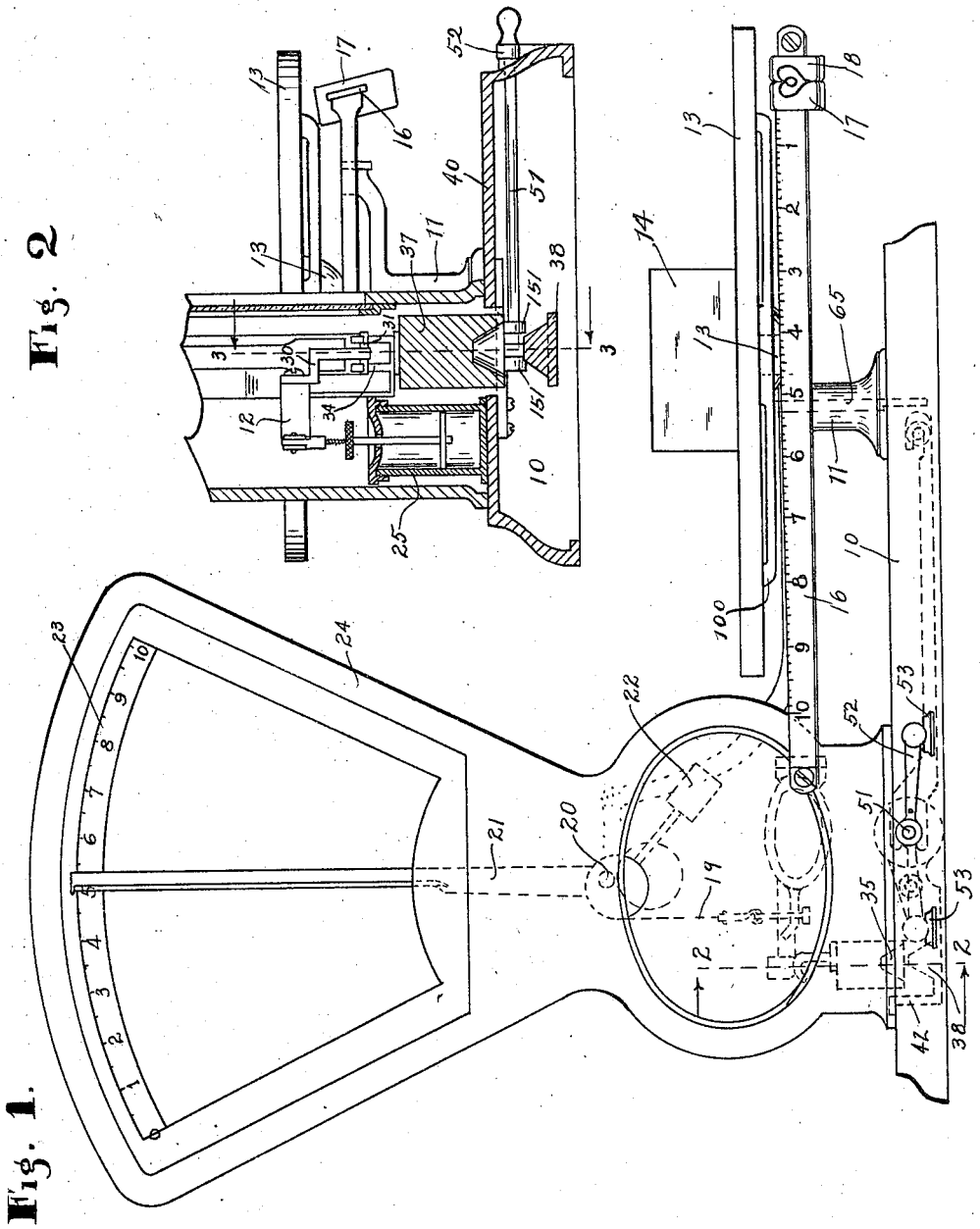

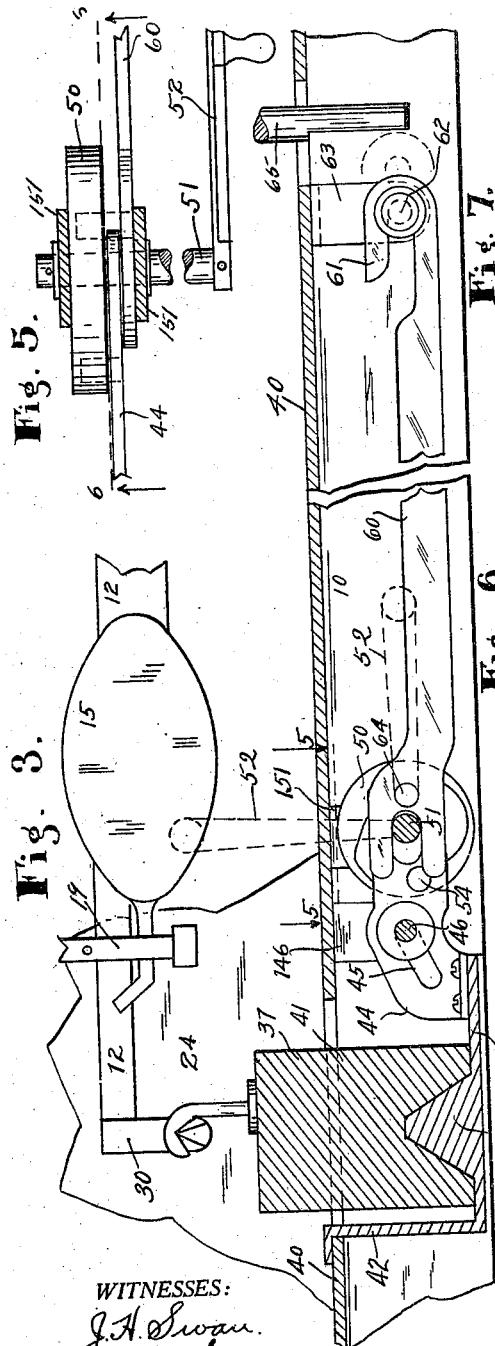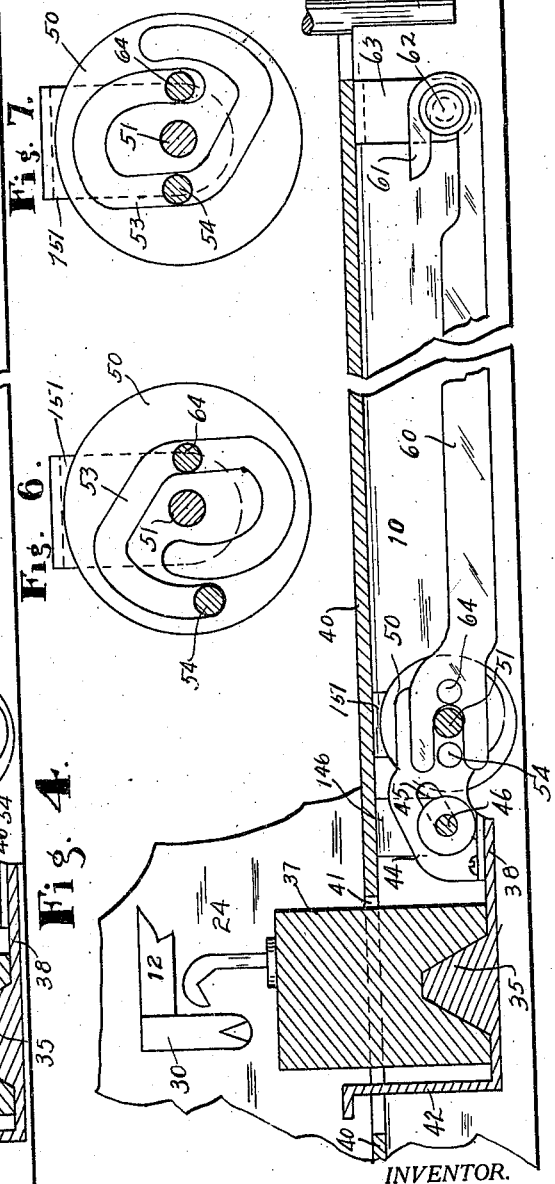

UNITED STATES PATENT OFFICE.

WILLIAM R. MITTENDORF, OF DAYTON, OHIO, ASSIGNOR TO THE ANDERSON TOOL COMPANY, OF ANDERSON, INDIANA, A CORPORATION OF INDIANA.

SCALE.

No. 921,436.

Specification of Letters Patent.

Patented May 11, 1909.

Application filed June 11, 1908. Serial No. 437,836.

*To all whom it may concern:*

Be it known that I, WILLIAM R. MITTENDORF, of Dayton, county of Montgomery, and State of Ohio, have invented a certain new and useful Scale; and I do hereby declare that the following is a full, clear, and exact description thereof, reference being had to the accompanying drawings, in which like numerals refer to like parts.

The object of this invention is to increase the capacity of scales, whether weighing or computing scales.

The chief feature consists of a poise mechanically mounted in connection with or detached from the lever or beam of the scale. This poise is adapted to be used in addition to other and useful poises employed in connection with scales. Thus the scale herein shown has a chart adapted to weigh ten pounds and two poises on the tare beam each adapted to increase the capacity ten pounds so as to make the total capacity thirty pounds. With the additional weight to increase the capacity twenty pounds, it is seen that although the scale has a ten pound chart, it has a weighing capacity of fifty pounds without very much change in or addition to the mechanism thereof.

In addition to the foregoing a feature of the invention consists in the means for attaching said poise to the lever or beam and detaching the same therefrom, said means consisting of a cam-actuated sliding support for the poise, so that, when the cam is actuated in one direction, the sliding support and poise will be elevated and when actuated in the opposite direction, they will be lowered and at the same time moved horizontally to bring about connection and disconnection.

Another feature of the invention consists in means in addition to the foregoing connected with the lever or beam of the scale which automatically moves said cam-controlled mechanism to its limit of movement, one way or the other, when said cam-controlled mechanism has not been completely operated by the person operating the machine. This additional means referred to operates whenever the load on the machine counterbalances and therefore tilts the lever or beam.

The full nature of this invention will be understood from the accompanying drawings and the following description and claims:

In the drawings Figure 1 is a side elevation of the scale with some of the obscure parts shown by dotted lines, the scale having a twenty-five pound load thereon which elevates the detachable poise. Fig. 2 is a transverse vertical section of a portion of the scale on the line 2—2 of Fig. 1. Fig. 3 is a central vertical section through a portion of the scale on a longitudinal line through the center of the detachable poise, parts being broken away and the parts being in position so as to mount the detachable poise on the inner end of the lever. Fig. 4 is the same with the poise detached. Fig. 5 is a horizontal section on the line 5—5 of Fig. 3. Figs. 6 and 7 are side elevations of the cam with associated parts in section and showing the cam in its two limits of movement. Fig. 8 is a vertical section through the scale on the same line as Fig. 3, parts being broken away and parts removed to show one incompletely operated position of the additional poise and the means for connecting it with and disconnecting it from the lever and the means for completing the movement of the poise, the latter, however, not being actuated. Fig. 9 is the same with the means for completing the movement of the poise actuated. Fig. 10 is substantially the same as Fig. 7 with the cam in position when the additional poise has not completed its upward and disengaging movement. Fig. 11 is the same as Fig. 6 showing the cam when the poise has not completed its downward and engaging movement.

In detail the drawings herein show a weighing scale having a base 10 and stand 11 on one end thereof on which the lever 12 is fulcrumed. A load receiving member 13 is fulcrumed on said lever to the right or outside of the fulcrum points of said lever on said stand 11 so that when the load 14 is placed upon said load receiving member 13 the outer end of the lever 12 is depressed and the inner end elevated for actuating the indicating mechanism. Hence the inner end of the lever 12 carries a weight 15 that normally maintains the inner end of the lever in its depressed position. There is a tare beam 16 secured to the lever 12 and parallel therewith and graduated for pounds and ounces up to ten pounds and provided with two sliding poises 17 and 18. The inner end of the lever 12 is connected by a connection 19 with the means 20 on which the indicator 21 is secured. The means 20 consists of a shaft that is actuated by a pendulum 22 whenever and as the inner end of the lever 12 is elevated by the load, and as the indicator is actuated it moves along a pound and ounce scale 23 on the fan-shaped portion 24 of the scale. The action of the lever 12 is checked by a dash pot 25, see Fig. 2.

The foregoing construction is old, so far as this invention is concerned, and will be found more fully and clearly described in the reissue application of Frank P. Dunn, Ser. No. 392,078, Sept. 9, 1907.

My invention consists in adding to the foregoing construction or to any other scale construction, means substantially as hereinafter described.

The lever 12 at its inner end has an arm 30 with transversely extending pin 31 projecting therethrough, as shown in Fig. 2. A detachable poise 37 is provided with a pair of upwardly extending hooks 34 that are adapted to be caught upon the pin 31 and, when the inner end of the lever is elevated by the load, to lift said poise so that said poise can act as an additional counter-weight to the load. The detachable poise 37 is supported by a plate 38 upon which it rests. This plate has an upwardly projecting cone 35 and the poise 37 has in the bottom thereof a conical recess so that the poise surrounds and fits upon said cone 35 and the cone centers and holds the poise in position when it is being deposited upon the plate 38. The top 40 of the base 10 is apertured at 41 for the vertical movement of the poise 37, and the plate 38 is mounted below the top 40 within the base 10 and has an upwardly extending hooked finger or flange 42 at its left hand end that projects through the opening 41 so that, when the plate 38 is in its lowermost position, the fingers 42 will engage the top 40 of the base and support the rear end of the plate 38 while in its normal position. The plate 38 at its right-hand end has a plate 44 projecting therefrom vertically and to the right, as shown in Fig. 3, that has an inclined slot 45 through which the pin 46 from the front wall of the base and bracket 146 projects, so that when the plate 44 is moved laterally the plate 38 and poise 37 will be moved not only laterally but also vertically. The lateral movement of the plates 38 and 44 is caused by a cam disk 50 rigidly mounted on a shaft 51 that projects through the front wall of the base and the bracket 151 and on its outer end has an actuating lever 52 secured thereto, whereby said cam disk 50 can be oscillated. Said cam disk is provided with a cam groove 53, as shown in Figs. 6 and 7, and into said groove 53 a pin 54 from the plate 44 projects. Therefore, when the cam disk 50 is oscillated from the position shown in Fig. 6 to the position shown in Fig. 7 by throwing the lever 52 from the dotted line position shown in Fig. 1 to the full line position, the pin 54 will be drawn laterally from the position shown in Fig. 6 to that shown in Fig. 7 and, therefore, the plates 44 and 38 drawn to the right and upwardly from the position shown in Fig. 3 into the position shown in Fig. 4. The last described movement disengages the poise 37 from the scale lever, as shown in Fig. 4, and permits the operation of the scale, as if said additional poise 37 were not present. When, however, it is desired to increase the capacity of the scale, to the extent of the poise 37, the lever 52 is moved from the full line position shown in Fig. 1 to the dotted line position and that returns the cam disk from the position shown in Fig. 7 to that shown in Fig. 6 which moves the plates 38 and 44 laterally from the position in Fig. 4 to that shown in Fig. 3, and as the poise moves laterally and downwardly the hooks 34 move over and upon the pins 31. Stops 53 are provided on the outside of the base 10 for the end of the lever 52 to rest upon in its two positions.

Sometimes the person operating the scale may not move the lever 52 and therefore the plate 38 and poise 37 to their limit of movement. To avoid this difficulty and automatically move said parts to their limit of movement, I provide the following mechanism. A lateral and horizontal sliding bar 60 is provided within the base 10 with the left hand end forked so as to ride upon and be held in place and guided by the shaft 51. The other end has a hook 61 that rides upon a pin 62 from the bracket 83 which extends down from the top 40 of the base 10. At the left hand end of said bar 60 there is an inwardly extending pin 64 that projects into the cam groove 53 of the cam disk, as shown in Figs. 6 and 7. Consequently, as the cam disk is operated, said bar 60 will be reciprocated, but if the cam disk is not completely operated the longitudinal movement of the bar 60 to the left will complete said movement of the disk. This left hand movement of the bar 60 is caused by an arm 65 extending downwardly from the scale lever 12 so that whenever a load is placed on said scale lever and the lever oscillates under the influence of the load the arm 65 will engage and move the bar 60 to the left. This completes the oscillation of the disk 50 because if said disk is left in an incompletely operated position, see Fig. 8, whether you are moving the lever 52 in one direction or the other, the inclined portions of the groove 53 in the disk 50 are so arranged that the pushing of the pin 64 to the left will cause the disk to finish its incomplete oscillation. Thus in Fig. 10 such movement to the left of the pin 64 will cause the disk to move in the direction of the arrow until it has reached the position shown in Fig. 7 and it will force the disk in the direction of the arrow in Fig. 11 so as to bring the disk in the position shown in Fig. 6.

A check bar 100 of well known construction extends from the load receiving member into the casing where its inner end is pivoted, for leveling the scale pan. Said check bar consists of a long portion secured at its outer end rigidly to the load receiving member 13, and its inner end is turned up and projects into the housing and is pivoted to a short horizontal member that is pivoted to the housing, the same not being shown in full lines, but by dotted lines in Fig. 1, and being substantially the same in character as the check shown in Letters Patent granted to Benjamin D. Emanuel, Nov. 17, 1908, 904,251.

What I claim as my invention and desire to secure by Letters Patent is:

1. The combination with the lever of a scale, of a poise provided with a hook adapted to engage said lever and means independent of said lever for moving said poise at an inclination to a horizontal line whereby when it is elevated the hook thereon will be out of the path of movement of the lever and when lowered will engage said lever.

2. The combination with the lever of a scale, of a poise provided with a hook adapted to engage said lever, a movable plate on which said poise rests when not elevated by said lever, and means for reciprocating said plate at an inclination to a horizontal line.

3. The combination with the lever of a scale, of a poise provided with a hook adapted to engage said lever, a movable plate on which said poise rests when not elevated by said lever, and means for reciprocating said plate at an inclination to a horizontal line, said plate being provided with a conical upward projection and the bottom of said poise being conically recessed whereby said projection will center and hold said poise while moving down and rest upon said plate.

4. The combination with the lever of a scale and a base therefor, of a detachable poise adapted to be connected with or disconnected from said lever, said base having an opening in the top thereof through which said poise moves, and means below the top of the base for moving said poise in connection with or disconnection from said lever.

5. The combination with the lever of a scale and a base therefor, of a detachable poise adapted to be connected with or disconnected from said lever, said base having an opening in the top thereof through which said poise moves, a plate below the top of the base for supporting and moving said poise, and means projecting from said plate for engaging the top of the base when the poise is lodged upon the lever for supporting said plate.

6. The combination with the lever of a scale, of a detachable poise, a movable plate on which said poise rests when not elevated therefrom by said lever, means for guiding the movements of said plate at an inclination to a horizontal line, a base for the scale within which said plate is mounted, and externally operative means for moving said plate.

7. The combination with the lever of a scale, of a detachable poise, a movable plate on which said poise rests when not elevated therefrom by said lever, means for guiding the movements of said plate at an inclination to a horizontal line, and an oscillatory cam for moving said plate.

8. The combination with the lever of a scale, of a detachable poise, a movable plate on which said poise rests when not elevated therefrom by said lever, means for guiding the movements of said plate at an inclination to a horizontal line, an oscillatory cam for moving said plate, a base within which said plate is mounted, a shaft on which said cam is secured that extends outside the base, and a lever on said shaft for operating it.

9. The combination with the lever of a scale and a base therefor with an opening through it, of a detachable poise extending through said opening in the base, a plate within the base for connecting said poise with and disconnecting it from said lever provided with a vertical extension having an inclined slot, a pin connected with the base and projecting through said slot, and means externally operative for moving said plate laterally whereby it will ride up and down on said pin.

10. The combination with the lever of a scale, of a detachable poise, mechanical means for connecting said poise with said lever or disconnecting the same as desired, and means actuated by the lever for moving said poise-placing means to its limit of movement when it has been only partially moved.

11. The combination with the lever of a scale, of a detachable poise, means operable by the operator for connecting said poise with and disconnecting it from said lever, and means controlled by the lever for completing the movement of said poise-placing means when it has been partially moved.

12. The combination with the lever of a scale, of a detachable poise, a movable plate on which said poise rests when not elevated therefrom by said lever, means for guiding the movements of said plate at an inclination to a horizontal line, an oscillatory cam for moving said plate, means for the operator to oscillate said cam, and means actuated by the operation of the scale lever for completing the movement of said cam when the same has been partially moved.

13. The combination with the lever of a scale, of a detachable poise, a movable plate on which said poise rests when not elevated therefrom by said lever, means for guiding the movements of said plate at an inclination to a horizontal line, an oscillatory cam for moving said plate, a longitudinally movable bar in operative engagement with said cam, and an arm secured to said scale lever and projecting into proximity with said bar so that when the scale lever is tilted by a load said arm will actuate said bar and cause it to complete the movement of said cam.

14. The combination with the lever of a scale, of a detachable poise, a movable plate upon which said poise rests, there being a part projecting from said plate in which there is an inclined slot, a pin mounted stationary in the scale that projects through said slot, a cam means for the operator to oscillate said cam, a pin from said cam plate entering the groove in the cam, whereby said weight may be mechanically connected with or disconnected from said lever, a longitudinally movable bar, a pin from said bar projecting into the groove in the cam, and an arm projecting from the scale lever for actuating said bar when the lever is tilted by a load, the groove in the cam being formed substantially as shown so that said actuation of the movable bar will move the cam and cause the poise to be moved to its complete limit of movement in either direction.

In witness whereof, I have hereunto affixed my signature in the presence of the witnesses herein named.

WILLIAM R. MITTENDORF.

Witnesses:
BERNARD H. WUEBBEN,
WALTER A. ROST.